US010763951B2

(12) United States Patent
Hanson

(10) Patent No.: US 10,763,951 B2
(45) Date of Patent: Sep. 1, 2020

(54) TRANSPORT OF MODULATED RADIO COMMUNICATION SIGNALS OVER DATA NETWORKS

(71) Applicant: CommScope Technologies LLC, Hickory, NC (US)

(72) Inventor: Van E. Hanson, Forest, VA (US)

(73) Assignee: CommScope Technologies LLC, Hickory, NC (US)

(*) Notice: Subject to any disclaimer, the term of this patent is extended or adjusted under 35 U.S.C. 154(b) by 91 days.

(21) Appl. No.: 15/569,678

(22) PCT Filed: Apr. 27, 2016

(86) PCT No.: PCT/US2016/029438
§ 371 (c)(1),
(2) Date: Oct. 26, 2017

(87) PCT Pub. No.: WO2016/176249
PCT Pub. Date: Nov. 3, 2016

(65) Prior Publication Data
US 2018/0123677 A1 May 3, 2018

Related U.S. Application Data

(60) Provisional application No. 62/153,114, filed on Apr. 27, 2015.

(51) Int. Cl.
*H04B 7/155* (2006.01)
*H04L 27/00* (2006.01)
*H04W 88/08* (2009.01)

(52) U.S. Cl.
CPC ..... *H04B 7/15507* (2013.01); *H04L 27/0008* (2013.01); *H04W 88/085* (2013.01)

(58) Field of Classification Search
CPC .......... H04B 7/15507; H04L 27/0008; H04W 88/085
See application file for complete search history.

(56) References Cited

U.S. PATENT DOCUMENTS

2002/0196781 A1* 12/2002 Salovuori ............. H04W 88/16
370/352
2003/0104781 A1 6/2003 Son
(Continued)

FOREIGN PATENT DOCUMENTS

CN 1956354 A 5/2007
CN 201639582 U 11/2010
(Continued)

OTHER PUBLICATIONS

IEEE 100 The Authoritative Dictionary of IEEE Standards Terms, Seventh Edition, Dec. 2000, definition of "wideband channel." (Year: 2000).*
(Continued)

*Primary Examiner* — Melvin C Marcelo
(74) *Attorney, Agent, or Firm* — Fogg & Powers LLC

(57) ABSTRACT

One embodiment is directed to a system comprising a first converter unit configured to receive a first modulated enterprise signal from an enterprise base station, demodulate the first modulated enterprise signal, extract enterprise data from the demodulated enterprise signal, and transmit the enterprise data to a modem over a wideband wireless communication network. The system further comprises a second converter unit configured to receive the enterprise data from the modem. The modem is configured receive the enterprise data from the wideband wireless communication network. The system is configured to create a second modulated enterprise signal corresponding to the first modulated enterprise signal using the enterprise data and wirelessly (Continued)

transmit the second modulated enterprise signal to an enterprise mobile station.

19 Claims, 4 Drawing Sheets

(56) References Cited

U.S. PATENT DOCUMENTS

| | | | |
|---|---|---|---|
| 2006/0172781 | A1 | 8/2006 | Mohebbi |
| 2009/0129442 | A1 | 5/2009 | Mohebbi et al. |
| 2010/0142528 | A1* | 6/2010 | Paltemaa .............. H04L 61/106 370/390 |
| 2011/0294534 | A1* | 12/2011 | Gunder ................. H04W 60/00 455/524 |
| 2012/0039176 | A1 | 2/2012 | Eshan et al. |
| 2012/0224555 | A1 | 9/2012 | Lee et al. |
| 2014/0079112 | A1 | 3/2014 | Ranson et al. |
| 2014/0119281 | A1 | 5/2014 | Kummetz et al. |
| 2015/0043548 | A1 | 2/2015 | Kang et al. |
| 2015/0244461 | A1* | 8/2015 | Kerek .............. H04B 10/25753 398/43 |

FOREIGN PATENT DOCUMENTS

| | | | | |
|---|---|---|---|---|
| CN | 102035589 | A | 4/2011 | |
| CN | 102037758 | A | 4/2011 | |
| CN | 102461009 | A | 5/2012 | |
| CN | 107438960 | A | 12/2017 | |
| KR | 20060108610 | A | 10/2006 | |
| WO | WO-2004023830 | A1 * | 3/2004 | ............ H04W 88/08 |
| WO | 2016176249 | A1 | 11/2016 | |

OTHER PUBLICATIONS

3GPP The Mobile Broadband Standard, 'About 3GPP', Aug. 26, 2019, pp. 1-4. (Year: 2019).*
European Patent Office, "Extended European Search Report from EP Application No. 16787014.6 dated Nov. 26, 2018", from Foreign Counterpart to PCT Application No. PCT/US2016/029438, dated Nov. 26, 2018, pp. 1-9, Published: EP.
International Bureau, "International Preliminary Report on Patentability from PCT Application No. PCT/US2016/029438 dated Nov. 9, 2017", from Foreign Counterpart to U.S. Appl. No. 15/569,678, dated Nov. 9, 2017, pp. 1-8, Published: Switzerland.
International Searching Authority, International Search Report and Written Opinion from PCT Application No. PCT/US2016/029438 dated Aug. 30, 2016, dated Aug. 30, 2016, pp. 1-12, WO.
China National Intellectual Property Administration, "First Office Action from CN Application No. 201680021619.8", from Foreign Counterpart to U.S. Appl. No. 15/569,678, dated Nov. 1, 2019, pp. 1-68, Published: CN.

* cited by examiner

TRANSPORT OF MODULATED RADIO COMMUNICATION SIGNALS OVER DATA NETWORKS

CROSS-REFERENCE TO RELATED APPLICATIONS

This application is a U.S. National Stage application of PCT Application Serial No. PCT/US2016/029438, filed 27 Apr. 2016 and titled "TRANSPORT OF MODULATED RADIO COMMUNICATION SIGNALS OVER DATA NETWORKS," which claims the benefit of U.S. Provisional Patent Application Ser. No. 62/153,114, filed Apr. 27, 2015, all of which are hereby incorporated herein by reference.

BACKGROUND

Certain aspects and features of the present disclosure relate to transmitting low bit rate signals over long distances using a wideband network.

Base stations and mobiles station usually communicate with each other directly (e.g., from antenna to antenna using radio frequency (RF) signals). Sometimes, however, a mobile station may be unable to communicate directly with a base station where the distance is too great, or because there is an obstruction between the base stations and the mobile stations. For example, there are fewer public safety systems than commercial systems. Therefore, in such cases, a repeater (e.g., a distributed antenna system ("DAS")) may be used to convey signals from a base station to a mobile station. The base station may communicate with the repeater.

SUMMARY

One embodiment is directed to a system comprising a first converter unit configured to receive a first modulated enterprise signal from an enterprise base station, demodulate the first modulated enterprise signal, extract enterprise data from the demodulated enterprise signal, and transmit the enterprise data to a modem over a wideband wireless communication network. The system further comprises a second converter unit configured to receive the enterprise data from the modem. The modem is configured receive the enterprise data from the wideband wireless communication network. The system is configured to create a second modulated enterprise signal corresponding to the first modulated enterprise signal using the enterprise data and wirelessly transmit the second modulated enterprise signal to an enterprise mobile station.

Another embodiment is directed to a method for use with a first converter unit configured to receive a first modulated enterprise signal from an enterprise base station, demodulate the first modulated enterprise signal, extract enterprise data from the demodulated enterprise signal, and transmit the enterprise data to a modem over a wideband wireless communication network. The method comprises receiving, at a second converter unit, the enterprise data from the modem. The modem is configured receive the enterprise data from the wideband wireless communication network. The method further comprises creating a second modulated enterprise signal corresponding to the first modulated enterprise signal using the enterprise data and wirelessly transmitting the second modulated enterprise signal to an enterprise mobile station.

DRAWINGS

DETAILED DESCRIPTION

The present disclosure relates to permitting a radio frequency ("RF") signal from a base station to be demodulated and transported over a data network. The demodulated signal may be modulated onto an RF carrier and transmitted to a mobile station by a distributed antenna system and/or repeater.

Figure 1:
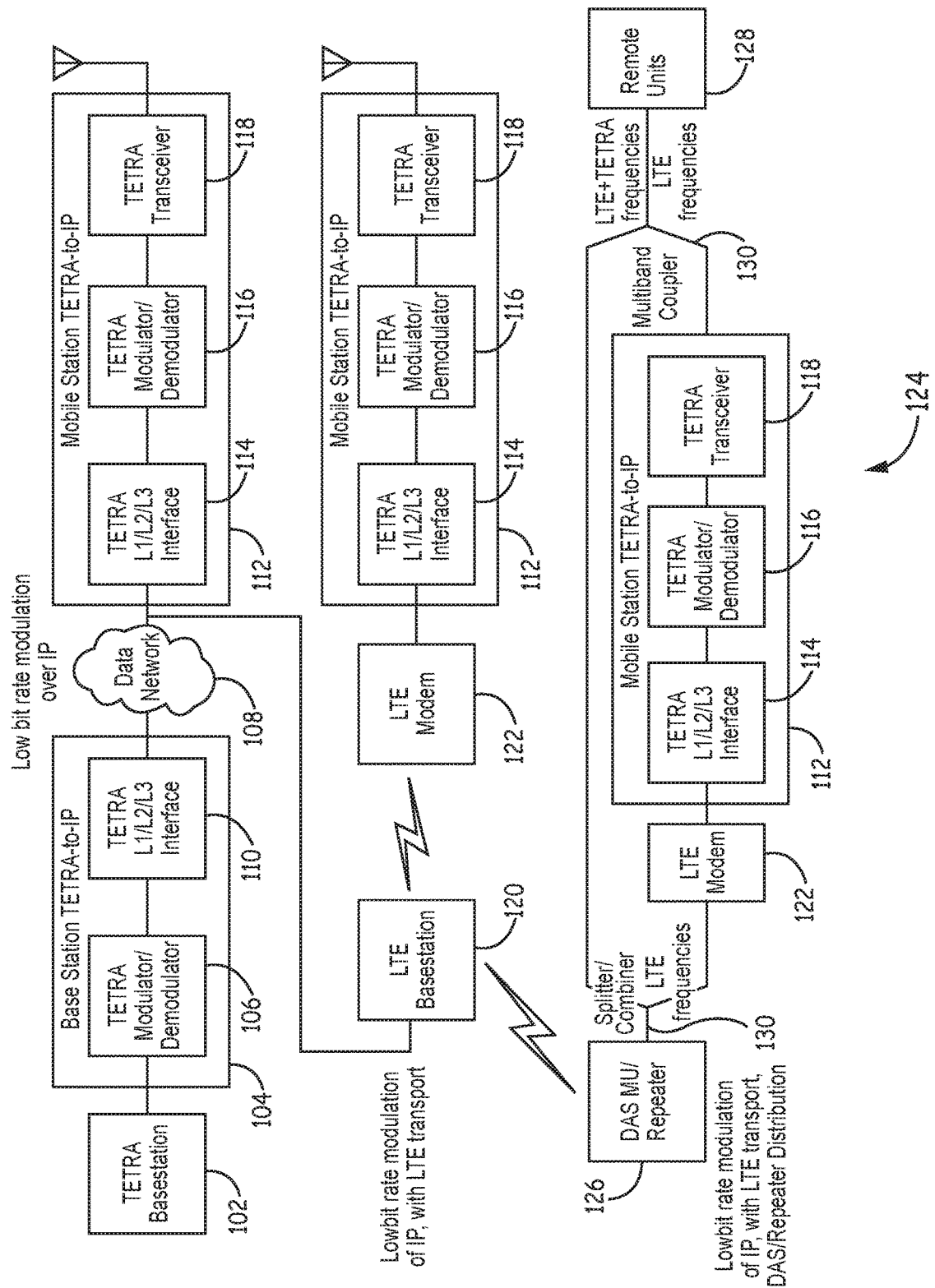
FIG. 1 is a block diagram illustrating a system for the transport of modulated radio communication signals over wired and/or wireless data networks.

In FIG. 1, a TETRA base station 102 is communicatively coupled to a base station TETRA-to-IP converter ("BS-T2IP") 104. In the downlink direction, the BS-T2IP 104 may demodulate signals received from the base station 102 using a Terrestrial Trunked Radio (TETRA) modulator/demodulator 106 included in the BS-T2IP 104. The demodulated data from the signals received from the base station 102 may be packaged into TCP/IP data packets and transmitted over a wired data network 108 by a Layer 1 (L1)/Layer 2 (L2)/Layer 3 (L3) Interface 110 to a mobile station TETRA-to-IP converter ("MS-T2IP") converter 112. Here, the demodulated TETRA data may be extracted from the TCP/IP data packets by a L1/L2/L3 Interface 114, re-modulated onto the original RF carrier by a TETRA modulator/demodulator 116, and transmitted to a TETRA mobile station by a TETRA transceiver 118.

Although the examples described herein illustrate sending a signal from a TETRA base station 102 to a TETRA mobile station over a wideband wireless network, such as a LTE network, other examples are not limited to TETRA or LTE, and various aspects may be implemented for any enterprise modulation type (e.g., private network signals, TETRA signals, EDACS signals, public safety system signals, land mobile radio signals, trunked signals, low bit rate signals, narrowband signals, etc.) using various wideband wireless communication data networks. Every demodulated bit need not be sent over the data network. Certain information may be known or may be derived (e.g., framing bits, ramp bits, etc.), making it unnecessary to send this information. Also, some of the call control, radio resource management, or mobility management messages on the TETRA channels may be intercepted, terminated or inserted by the L1/L2/L3 Interfaces 110 or 114 during the processing of the demodulated data in either the BS-T2IP or MS-T2IP blocks 104 or 112.

When a wired data connection between the data network 108 and the MS-T2IP 114 is not available, a commercial wireless data communications system, like LTE, may be used to transport the demodulated data as shown in the middle part of FIG. 1. The BS-T2IP 104 may demodulate downlink signals from the TETRA base station 102. The demodulated data from the signals may be packaged into TCP/IP data packets and transmitted over a data network 108 to an LTE base station 120. The LTE base station 120 may transmit the data over the LTE network to an LTE modem 122 coupled to a MS-T2IP 112. The LTE modem 122 may extract only the TETRA data and transmit the TETRA data to the MS-T2IP 112. The MS-T2IP 114 may re-modulate the TETRA data onto an RF signal and transmit the signal to a TETRA mobile station as described above.

In another aspect, a repeater system (e.g., a digital antenna system (DAS)) 124 may be used to transport the demodulated data, as shown in the lower part of FIG. 1. In the case of a repeater system 124 like the one shown in the lower part of FIG. 1, the repeater 124 may already be transporting a data signal (e.g., an LTE signal) that may be capable of transporting tens or hundreds of megabytes of data. In this case, a LTE modem 122 can be used to provide the connection between the data network 108 and the MS-T2IP function 112. The BS-T2IP 104 may demodulate downlink signals from the TETRA base station 102. The demodulated data from the signals may be packaged into TCP/IP data packets and transmitted over a data network 108 to an LTE base station 120 wirelessly coupled to a repeater and/or DAS 124. The LTE base station 120 may be coupled via a wireless or wired connection.

The LTE base station 120 may transmit the data packets to a master unit 126 in the DAS 124. The master unit 126 may transmit signals received from the LTE Base Station 120 to an LTE modem 122 and to the remote units 128 in the DAS 124 using a splitter/combiner 130 (also referred to here as a "multiband coupler 130"). The multiband coupler 130 may function as a splitter in the downlink direction and a combiner in the uplink direction. The LTE modem 122 may receive the LTE signals from the master unit 126 (through the multiband splitter/combiner 130), extract the TETRA data, and transmit the data to a MS-T2IP 112. The MS-T2IP 112 may modulate the data onto a TETRA RF signal. The TETRA signals may be transmitted by the MS-T2IP 112 and combined with the LTE signals by a multiband coupler 130. The combined signal may be transmitted to the remote units 128. The TETRA signals created by the MS-T2IP 112 are in a different frequency band than the LTE signals (e.g., 400 MHz for the TETRA signals vs. 2100 MHz for the LTE signals). The remote units 128 may receive the LTE signals and TETRA signals, amplify both signals and transmit the signals to the user equipment ("UE") within their respective coverage areas. In the uplink direction, the remote unit 128 can receive both LTE signals and TETRA signals from mobile stations within its coverage area.

Although the master unit 126, multiband couplers 130, LTE modem 122, and MS-T2IP 112 are shown using separate boxes, it is to be understood that these items can be integrated together into a single assembly (sometimes also referred to here collectively as the master unit 126).

Although only one BS-T2IP 104 is shown in communication with one MS-T2IP 112, a BS-T2IP 104 may communicate with any number of MS-T2IP devices 112. TETRA base stations 102 may have multiple channels. Each channel of a TETRA base station 102 may serve multiples users. Multiple users may be serviced by different DAS systems 124 using different MS-T2IPs 112.

Figure 2:
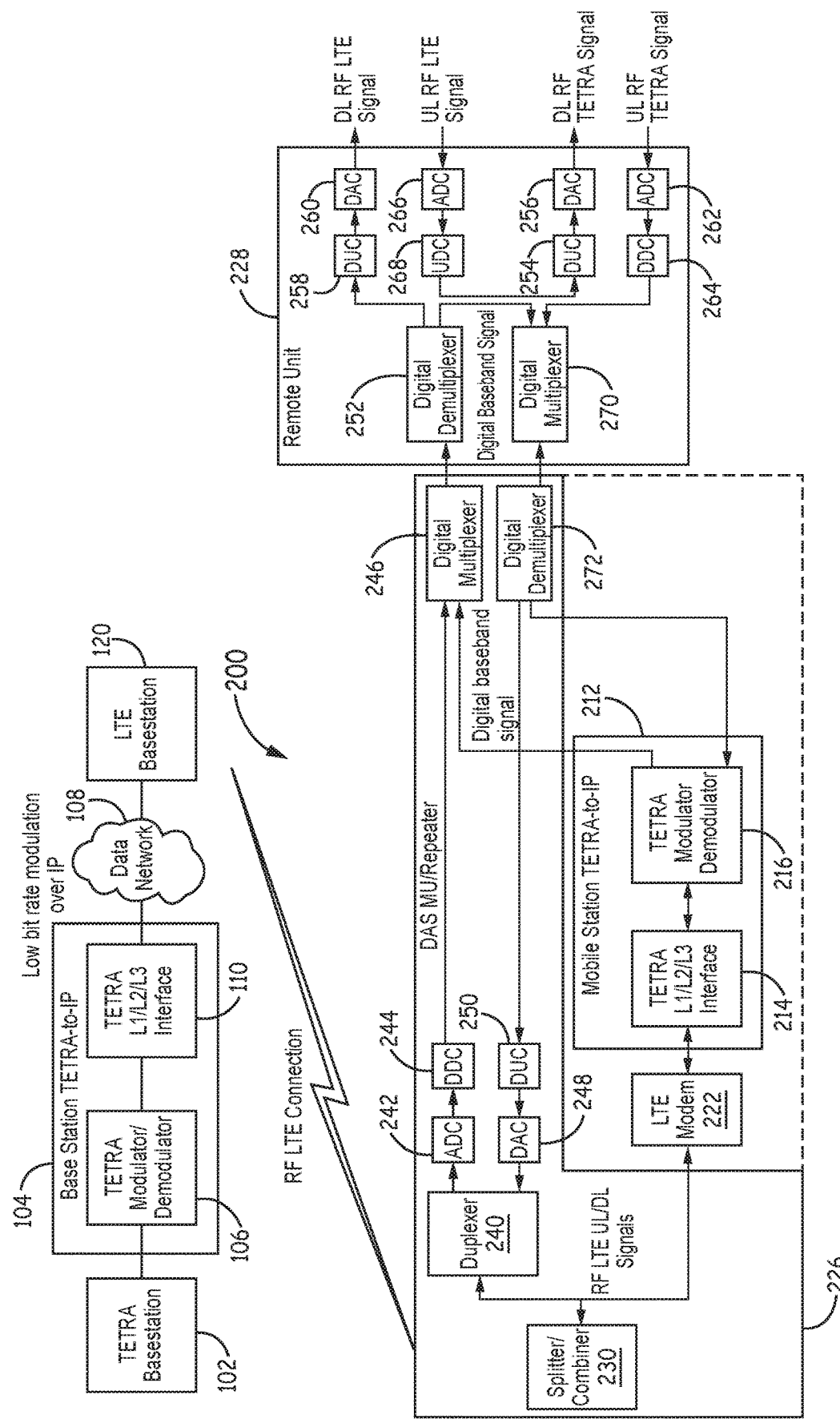
FIG. 2 shows a diagram for transporting a TETRA signal over a digital DAS/repeater system.

FIG. 2 shows a diagram for transporting a TETRA signal over a DAS/repeater system 200 that may be transporting a digital data signal. In this example, the LTE modem 222 and the MS-T2IP 212 are integrated into a digital master unit 226 of the DAS/repeater system 200 along with the conventional components of the digital master unit 226. The TETRA base station 102 is communicatively coupled to the BS-T2IP 104. A TCP/IP connection may be established between the BS-T2IP 104 and MS-T2IP 212. The TCP/IP connection may be established over an LTE connection where the MS-T2IP 212 is connected to the LTE modem 222 communicatively coupled to the LTE base station 120, either directly or through the DAS/repeater 200.

The BS-T2IP 104 may receive TETRA downlink RF signals from the TETRA base station 102. The BS-T2IP 104 may demodulate and decode the TETRA RF signal. TETRA data bits may be extracted from the TETRA RF signal by the BS-T2IP 104 by the TETRA modulator/demodulator 106 included in the BS-T2IP 104. The TETRA L1/L2/L3 interface 214 included in the BS-T2IP 104 may process the data bits and determine the data bits and other information necessary to send to the MS-T2IP 212 for recreating the TETRA RF signal. In some aspects, TETRA RF information may be transmitted in frames. For example, the data in each frame may be processed by the BS-T2IP 104 and sent to the MS-T2IP 212.

A TETRA frame data packet may be sent from the BS-T2IP 104 to the MS-T2IP 212 over the TCP/IP connection established with the LTE modem 222. The data may be routed to the LTE base station 120 and modulated onto an LTE RF signal. The LTE RF signal may be transmitted by the LTE base station 120 to the master unit 226 of the DAS 200. The master unit 226 may send the received signal to a splitter/combiner 230, enabling both an LTE modem 222 and the conventional components of the digital master unit 226 to receive the LTE RF signal. The LTE signal may include data for multiple mobile stations including mobile stations in the remote unit's area of coverage.

In this example, the conventional components of the digital master unit 226 include a duplexer 240 for combining and separating uplink and downlink signals, and a downlink signal path and an uplink signal path. The downlink signal path comprises an analog-to-digital (ADC) converter 242 to convert the received analog LTE signal to a digital signal and a digital downconverter (DUC) 244 to digitally downconvert the digital signal to produce digital baseband LTE data that is provided to a digital multiplexer 246. The uplink signal path comprises a digital up-converter (DUC) 248 to digitally up-convert received uplink digital baseband LTE data and a digital-to-analog converter (DAC) 250 to convert the up-converted digital LTE data to an uplink analog signal, which can be provided to an LTE base station 120 (for example, via an off-the-air repeater (not shown)).

The LTE modem 222 in the digital master unit 226 may demodulate, decode, and process data from the LTE signal and transmit the data to the MS-T2IP 212. The TETRA L1/L2/L3 interface 214 and a TETRA modulator/demodulator 216 of the MS-T2IP 212 may recreate a digital TETRA baseband signal from the data. The digital TETRA baseband signal may be combined by the digital multiplexer 246 with digital LTE baseband data produced in the downstream signal path of the master unit 226. The combined digital data is communicated to the remote unit 228. A digital demultiplexer 252 in the remote unit 228 separates the digital LTE baseband data from the digital TETRA baseband data. The digital LTE baseband data is digitally up-converted by a digital up-converter (DUC) 254 and an analog signal is produced from the digitally up-converted data by a digital-to-analog (DAC) converter 256. The resulting analog TETRA signal can be filtered, up-converted, power amplified, and radiated to TETRA mobile stations in the coverage area of the remote unit 228. Similar processing is performed for the digital LTE baseband data, which is digitally up-converted by a digital up-converter (DUC) 258 and an analog signal is produced from the digitally up-converted data by a digital-to-analog converter (DAC) 260. The resulting analog LTE signal can be up-converted, power amplified, and radiated to LTE user equipment in the coverage area of the remote unit 228.

In the uplink direction, an analog TETRA uplink RF signal received at the remote unit 228 is filtered, down-converted, amplified and then converted to a digital signal by an analog-to-digital converter (ADC) 262 and the digital signal is digitally down-converted by a digital down-converter (DDC) 264 to produce digital TETRA baseband data. Similar processing is performed for the LTE signals. An analog LTE uplink RF signal received at the remote unit 228 is filtered, down-converted, amplified and then converted to a digital signal by an analog-to-digital converter (ADC) 266 and the digital signal is digitally down-converted by a digital down-converter (DDC) 268 to produce digital LTE baseband data. A digital multiplexer 270 digitally combines the uplink digital TETRA baseband data with the uplink digital LTE baseband data and the resulting combined digital data is transmitted to the digital master unit 226. A digital de-multiplexer 272 in the master unit 226 separates the uplink digital LTE baseband data from the uplink digital TETRA baseband data. The uplink digital LTE baseband data is provided to the DUC 248 for processing by the uplink signal path of the conventional DAS components as described above. The uplink digital TETRA baseband data is provided to the TETRA modulator/demodulator 216 of the MS-T2IP 212, which digitally demodulates the uplink digital TETRA baseband data to recover the data transmitted by the TETRA mobile station. The data is provided to the TETRA L1/L2/L3 interface 214, which packages the demodulated data into TCP/IP data packets. The data packets are provided to the LTE modem 222 for communicating to the LTE base station 120.

The TETRA signals are in a different frequency band than the LTE signals (e.g., 400 MHz for the TETRA signals vs. 2100 MHz for the LTE signals).

A modem may be used to allow the data network and the MS-T2IP to communicate. The modem may extract the TETRA data and convert the digital signal to a radio frequency signal. A TETRA signal may be recreated from the data, combined with the original LTE data signal, and sent to a mobile station.

Figure 3:
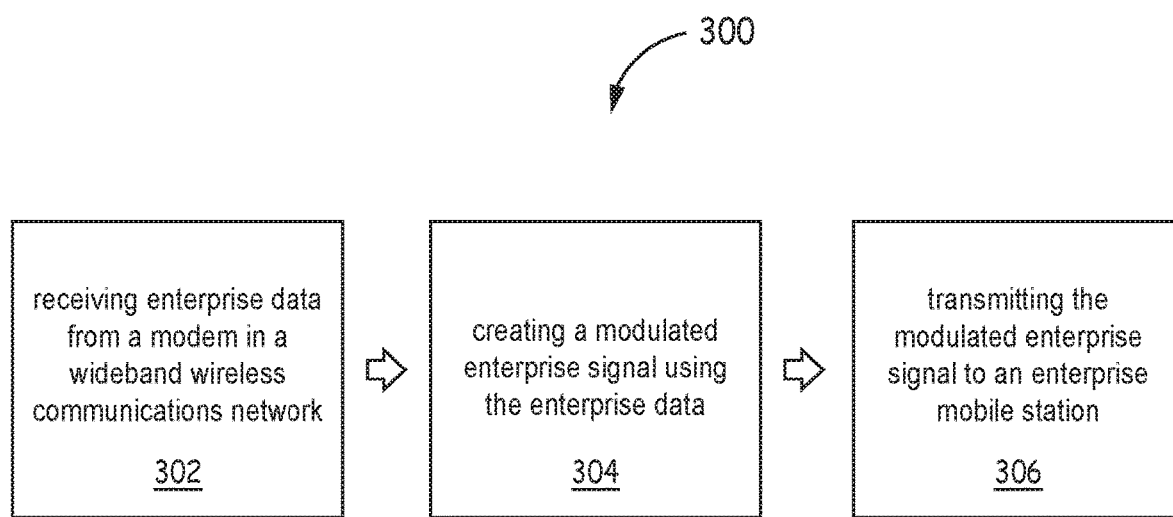
FIG. 3 is a flowchart illustrating a method for transmitting TETRA data through a wideband wireless communications network.

FIG. 3 is a flowchart illustrating a method 300 for transmitting TETRA data through a wideband wireless communications network, such as the network shown in FIG. 1.

The TETRA (or other enterprise) data may be received from a modem in the LTE (or other wideband wireless communications network) (block 302). The modem (for example, an LTE modem) may receive demodulated TETRA data that originated from a TETRA base station and that has been transmitted over a data network to a base station (for example, an LTE base station) in the wideband wireless communications network (for example, an LTE wideband wireless communications network). The latter base station may wirelessly transmit the demodulated TETRA data to the modem. The modem may extract the TETRA data from the received RF signal wirelessly transmitted to the modem.

A modulated TETRA signal may be created using the TETRA data (block 304). The modulated TETRA signal may be created by modulating the TETRA data onto a radio frequency signal. The modulated TETRA signal may be transmitted to a TETRA mobile station (block 306).

Figure 4:
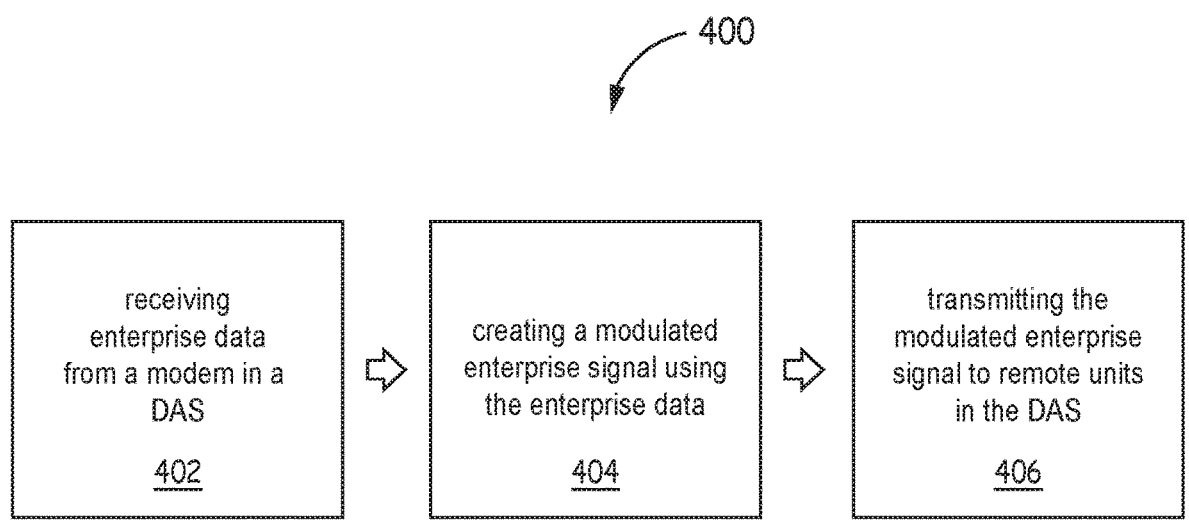
FIG. 4 is a flowchart illustrating a method for transmitting TETRA data through a distributed antenna system and/or repeater.

FIG. 4 is a flowchart illustrating a method 400 for transmitting TETRA data through a DAS, such as the system shown in FIG. 1.

The TETRA (or other enterprise) data may be received from a modem in the DAS (block 402). The modem (for example, an LTE modem) may receive demodulated TETRA data that originated from a TETRA base station and that has been transmitted over a data network to a base station (for example, an LTE base station) in the wideband wireless communications network (for example, an LTE wideband wireless communications network). The latter base station may wirelessly transmit the demodulated TETRA data to a master unit in the DAS. The master unit may forward the radio frequency signal wirelessly received from the base station to the modem. The modem may extract the TETRA data from the radio frequency signal.

A modulated TETRA signal may be created using the TETRA data (block 404). The modulated TETRA signal may be created by modulating the TETRA data to a radio frequency signal. The modulated TETRA signal may be transmitted to remote units in the DAS (block 406).

The various units described above can be implemented in many ways and circuits (for example, using software executing on one or more suitable programmable processors, a field programmable gate array (FPGA), an application specific integrated circuit (ASIC), a circuit using discrete components, etc.).

The foregoing description of the examples, including illustrated examples, of the invention has been presented only for the purpose of illustration and description and is not intended to be exhaustive or to limit the invention to the precise forms disclosed. Numerous modifications, adaptations, and uses thereof will be apparent to those skilled in the art without departing from the scope of this invention. The illustrative examples described above are given to introduce the reader to the general subject matter discussed here and are not intended to limit the scope of the disclosed concepts.

What is claimed:
1. A system comprising:
a first converter circuit configured to receive a first modulated enterprise signal from an enterprise base station, demodulate the first modulated enterprise signal, extract enterprise data from the demodulated enterprise signal, and transmit the enterprise data to a base station of a wideband wireless communication network; and
a second converter circuit configured with a modem to receive the enterprise data from the wideband wireless communication network;
wherein the system is configured to create a second modulated enterprise signal corresponding to the first modulated enterprise signal using the enterprise data and wirelessly transmit the second modulated enterprise signal to an enterprise mobile station.

2. The system of claim 1, wherein the first and second modulated enterprise signals comprises modulated TETRA signals.

3. The system of claim 1, wherein the modem comprises an LTE modem, and wherein the wideband wireless communication network comprises an LTE network.

4. The system of claim 1, wherein the first converter circuit is configured to transmit the enterprise data to the modem over the wideband wireless communication network via a wired data network.

5. The system of claim 1, further comprising a distributed antenna system comprising a master unit and at least one remote unit, the master unit configured to transport a signal derived from the enterprise data to the at least one remote unit in the distributed antenna system.

6. The system of claim 5, wherein the second converter circuit is integrated with the master unit.

7. The system of claim 5, wherein the second converter circuit is further configured to:
create the second modulated enterprise signal by modulating the enterprise data onto a radio frequency signal; and
transmit the second modulated enterprise signal using the distributed antenna system.

8. The system of claim 5, wherein the master unit comprises a digital multiplexer; and
wherein the second converter circuit is further configured to:
generate enterprise digital baseband data; and
output the enterprise digital baseband data to the digital multiplexer;
wherein the digital multiplexer is configured to combine the enterprise digital baseband data with wideband wireless communication network digital baseband data and communicate the combined data to the at least one remote unit; and
wherein the at least one remote unit is configured create the second modulated enterprise signal from the enterprise digital baseband data and wirelessly transmit the second modulated enterprise signal.

9. The system of claim 1, wherein the second converter circuit is further configured to:
create the second modulated enterprise signal by modulating the enterprise data onto a radio frequency signal; and
transmit the modulated enterprise signal to the enterprise mobile station.

10. A method for use with a first converter circuit configured to receive a first modulated enterprise signal from an enterprise base station, demodulate the first modulated enterprise signal, extract enterprise data from the demodulated enterprise signal, and transmit the enterprise data to a base station of a wideband wireless communication network, the method comprising:
receiving, at a modem of a second converter circuit, the enterprise data from the wideband wireless communication network;
creating a second modulated enterprise signal corresponding to the first modulated enterprise signal using the enterprise data; and
wirelessly transmitting the second modulated enterprise signal to an enterprise mobile station.

11. The method of claim 10, wherein wirelessly transmitting the second modulated enterprise signal to the enterprise mobile station comprises wirelessly transmitting the second modulated enterprise signal to the enterprise mobile station using a distributed antenna system.

12. The method of claim 10, wherein the first and second modulated enterprise signals comprises modulated TETRA signals.

13. The method of claim 10, wherein modem comprises an LTE modem, and wherein the wideband wireless communication network comprises an LTE network.

14. The method of claim 10, wherein the first converter circuit is configured to transmit the enterprise data to the modem over the wideband wireless communication network via a wired data network.

15. The method of claim 10, further comprising transporting a signal derived from the enterprise data from a master unit of a distributed antenna system to at least one remote unit of the distributed antenna system.

16. The method of claim 15, wherein the second converter circuit is integrated with the master unit.

17. The method of claim 15, wherein creating the second modulated enterprise signal comprises:
modulating the enterprise data onto a radio frequency signal; and
wherein wirelessly transmitting the second modulated enterprise signal to the enterprise mobile station comprises wirelessly transmitting the second modulated enterprise signal to the enterprise mobile station using the distributed antenna system.

18. The method of claim 15, further comprising:
generating, at the second converter circuit, enterprise digital baseband data;
combining the enterprise digital baseband data with wideband wireless communication network digital baseband data; and
communicating the combined data to the at least one remote unit; and
wherein creating the second modulated enterprise signal comprises creating, at the at least one remote unit, the second modulated enterprise signal from the enterprise digital baseband data.

19. The method of claim 10, wherein the second converter circuit is configured to:
create the second modulated enterprise signal by modulating the enterprise data onto a radio frequency signal; and
transmit the modulated enterprise signal to the enterprise mobile station.

* * * * *